Dec. 10, 1957 D. H. A. HAGEMAN 2,816,237

SYSTEM FOR COUPLING SIGNALS INTO AND OUT OF FLIP-FLOPS

Filed May 31, 1955

INVENTOR
DONALD H. A. HAGEMAN

BY Henry Heyman
ATTORNEY.

United States Patent Office 2,816,237
Patented Dec. 10, 1957

2,816,237

SYSTEM FOR COUPLING SIGNALS INTO AND OUT OF FLIP-FLOPS

Donald H. A. Hageman, Los Angeles, Calif., assignor to Hughes Aircraft Company, Culver City, Calif., a corporation of Delaware Application May 31, 1955, Serial No. 511,851

4 Claims. (Cl. 307—88.5)

Figure 1:
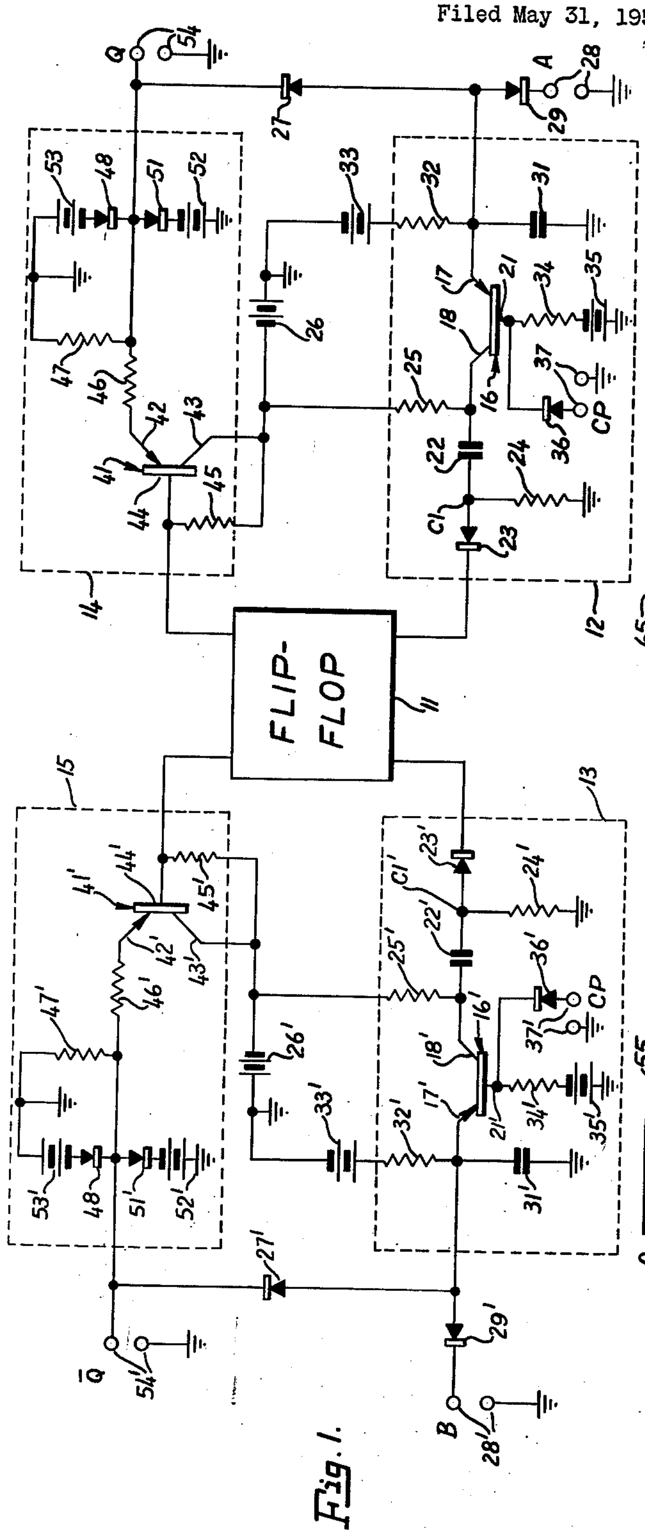

This invention relates generally to bistable circuits and, more particularly, to a system adapted to couple signals into and out of a flip-flop.

In digital computers employing binary logic, the most common means of transferring intelligence from one point to another or for controlling the operation of the various circuits is to use bistable multivibrators, commonly referred to as flip-flops, in conjunction with diode-resistor gates. As is well known, in this type of operation, it is desirable to connect the output signals of the flip-flop directly to the gates to achieve voltage-state gating. In computers employing vacuum tubes this is readily accomplished.

However, in recent years it has become desirable to use transistors for the active circuit elements in the computer flip-flops. By so doing, the life of the computer is increased, power consumption reduced, and overall long-term reliability is increased. But due to the low input impedance, high output impedance, and relatively low current-carrying capacity of transistors, it has been impossible to obtain the desired voltage-state type of gating without increasing the number of transistor flip-flops. One transistor flip-flop circuit can only supply power to a small number of gates simultaneously.

Accordingly, it is an object of the present invention to provide a system adapted to couple signals into and out of a transistor flip-flop which isolates the source of the intelligence signal from the flip-flop, thus preventing loading of the intelligence signal source with the flip-flop.

Another object of the present invention is to provide a system for use in a digital computer adapted to couple signals into and out of a transistor flip-flop which will allow a single flip-flop to supply intelligence signals to twenty-five or thirty gates at the same time.

A further object of the present invention is to provide an input circuit for a flip-flop which will isolate the clock pulse signal source from the flip-flop and thus prevent loading of the clock pulse signal source.

A system in accordance with the present invention adapted to couple signals into and out of a flip-flop includes a flip-flop preferably of the transistor type having two input and two output circuits. Each of the input circuits includes a monostable device which is triggered into its unstable state upon application of signals to it. Upon being driven into the unstable state the monostable device produces an output or trigger signal which is coupled from the device to the flip-flop, thereby causing the flip-flop to change from one of its stable states to the other. The monostable device is designed so that it automatically returns to its stable state in a predetermined time and so that it remains in its unstable state for a shorter time than the duration of the applied signals. Therefore, the monostable device isolates the signal source from the flip-flop to prevent loading of the signal source. Each of the output circuits includes a semiconductor amplifier for amplifying the flip-flop output signals.

Figure 2:
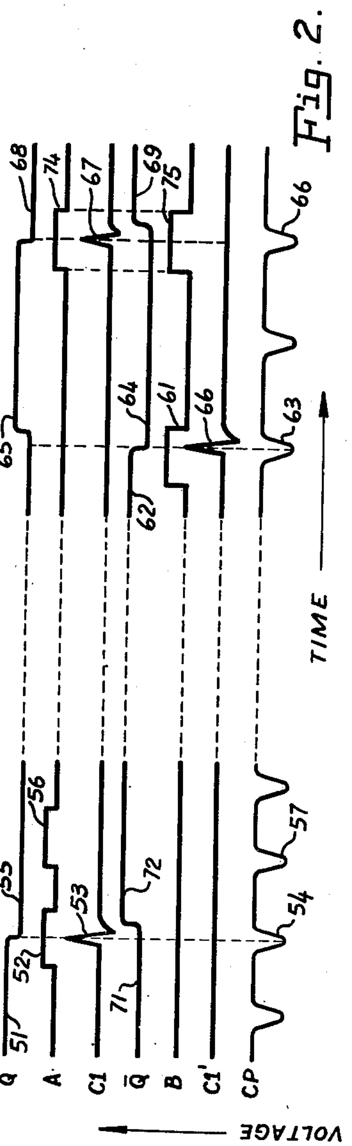

The novel features of the present invention are set forth in particularity in the appended claims. Other and more specific objects of the invention will become apparent from a consideration of the following description taken in conjunction with the accompanying drawing in which:

Fig. 1 is a schematic circuit diagram of the system of the present invention; and Fig. 2 is a graph illustrating voltage waveforms taken at various points of the circuit of Fig. 1.

Referring now to the drawing wherein like components are designated by the same reference characters and, more particularly, to Fig. 1, there is shown a flip-flop represented by rectangle 11. The flip-flop may, for example, be a transistor flip-flop employing point contact transistors as shown and described in Air Force Cambridge Research Center Technical Report 53—16, entitled "High speed transistor flip-flops," by A. W. Carlson, published June 1953, but it is to be understood that any other type flip-flop may be used. The flip-flop described in the above-mentioned article included emitter coupling, grounded base, a resistor in each base circuit, input signals applied individually to each base, and output signals produced across resistors in each collector. Flip-flop 11 has two input circuits 12 and 13 and two output circuits 14 and 15.

Input circuit 12 includes a point-contact transistor 16 represented by the accepted schematic symbol and having an emitter 17, a collector 18, and a base 21. Coupling means, such as capacitor 22, is connected to collector 18. Rectifying means, such as diode 23, is connected between capacitor 22 and the input of flip-flop 11 and is poled to pass positive going signals to the flip-flop. A resistor 24 is connected between the junction of capacitor 22 and diode 23 and ground across which the output signal of transistor 16 is developed. A load resistor 25 is connected to collector 18. A source of operating potential, such as battery 26, has its negative terminal connected to load resistor 25 and its positive terminal grounded. Battery 26 biases collector 18 in a non-conducting polarity. Gating means, such as diode 29, is connected between emitter 17 and input terminals 28, one of which is grounded. A resistor 32 is connected between emitter 17 and the positive terminal of a source of operating potential, such as battery 33, which has its negative terminal grounded. Battery 33 biases emitter 17 in a conducting polarity. Capacitor 31 is connected between emitter 17 and ground. A resistor 34 is connected between base 21 and the negative terminal of a source of biasing potential, such as battery 35, which has its positive terminal grounded. Rectifying means, such as diode 36, is connected between base 21 and input terminals 37, one of which is grounded, and is used to apply periodically-recurring control or clock pulse signals identified CP to transistor 16.

Input circuit 13 is identical to input circuit 12 and the components thereof are designated by the same reference characters primed.

Output circuit 14 includes a junction transistor 41 represented by its accepted schematic symbol and having an emitter 42, a collector 43, and a base 44. Transistor 41 is used to amplify the flip-flop output signals. Resistor 45 is connected between base 44 and the negative terminal of battery 26. Base 44 is also connected to the output of flip-flop 11. Collector 43 is connected to the negative terminal of battery 26. Resistor 46 is connected between emitter 42 and output terminals 54, one of which is grounded. Clamping means, including diodes 48 and 51, each of which is connected to output terminal 54, is used to limit the magnitude of the voltage swing of the flip-flop output signals. A source of clamping potential, such as battery 52, has its negative terminal connected to diode 51 and its positive terminal grounded. Another source of clamping potential, such as battery 53, has its negative terminal connected to diode 48 and its positive terminal grounded. Also connected between output terminal 54 and ground is resistor 47. Diode 27 is connected between output terminal 54 and emitter 17 to provide a suppression signal that will prevent ambiguous triggering of flip-flop 11, and which is more fully explained hereinafter.

Output circuit 15 is identical to output circuit 14 and the components thereof are represented by the same reference characters primed.

In discussing the operation of the circuit of the present invention reference will be made to Fig. 2 where in the abscissa represents time and the ordinate, voltage. Each of the waveforms of Fig. 2 was taken by measuring between the designated points in the circuit of Fig. 1 and ground.

During quiescent condition, that is, when no signal is applied to input terminals 28 or 28′, transistor 16 is non-conducting. Diodes 27 and 29 form a logical "and" gate, equivalent to the logical "and" operation of Boolean algebra. Therefore, unless output signal Q at output terminals 54 and input signal A at input terminals 28 are each in their 1-representing, or high level, no signal will be impressed upon emitter 17. In the absence of an input signal, diode 29 will be conducting since its anode is maintained positive with respect to its cathode by battery 33 assuming terminals 28 are connected to the A signal source. Diode 27 will be conducting or non-conducting, depending upon the state of output signal Q. If Q is in its zero-representing state, diode 27 conducts; if Q is in its 1-representing state, diode 27 is non-conducting. Battery 35 maintains the cathode of diode 36 negative with respect to its anode, therefore, diode 36 is also conducting, assuming terminals 37 are connected to the clock pulse source. Diode 23 is non-conducting.

Assuming as a first example of operation that output signal Q is in its high or 1-representing level, as shown at 51 on Fig. 2, that output signal $\overline{Q}$ is in its low or zero level as shown at 71, and that clock pulses as represented by the symbol CP on Fig. 2 are applied simultaneously to input terminals 37 and 37′.

Assume now that an input signal 52, as shown on curve A, is applied to input terminals 28. Since input signal 52 will cause the potential on the cathode of diode 29 to become positive with respect to its anode, diode 29 will become non-conducting. Since Q is at its 1-level 51, diode 27 is also non-conducting. Capacitor 31 will, therefore, charge toward the potential of battery 33 but the potential of the capacitor will be limited by the amplitude of input signal 52 present on the cathode of diode 29. The charge on capacitor 31 is applied directly to emitter 17 of transistor 16. This conditions transistor 16 to conudct by applying a positive potential to its emitter. During the time that input signal 52 is applied and transistor 16 is conditioned to conduct, the next successive clock pulse 54 impressed upon the anode of diode 36 causes diode 36 to become non-conducting. Base 21 of transistor 16 then becomes negative with respect to its emitter because of battery 35 which in turn causes transistor 16 to conduct. When transistor 16 conducts, a voltage pulse is developed across resistor 25. This pulse is passed by coupling capacitor 22 and appears across resistor 24 as represented at 53 of curve $C_1$ on Fig. 2. It will be noted that the duration of the positive portion of pulse 53 is less than the duration of the applied clock pulse 54. This smaller duration is caused by the discharge time constant of capacitor 31 which is determined principally by transistor 16 and capacitor 22. When the charge on capacitor 31 becomes less than the emitter potential necessary for operation, transistor 16 becomes non-conducting. It is seen, therefore, that transistor 16 cuts off automatically and no power from the clock pulse signal source is required to accomplish this.

The voltage appearing across resistor 24 causes the anode of diode 23 to become positive with respect to its cathode and this causes diode 23 to conduct, thus applying the positive portion of the output pulse from transistor 16 to flip-flop 11. When pulse 53 becomes negative, diode 23 becomes non-conducting, therefore, the negative portion of pulse 53 is not applied to flip-flop 11. If the negative portion of pulse 53 were allowed to reach flip-flop 11, the flip-flop would tend to switch back to that state of operation it had prior to the application of pulse 53. The positive portion of pulse 53, therefore, causes flip-flop 11 to change from one of its stable states to the other. Output signal Q then changes from its 1-level to its zero or low level as represented at 55 on Fig. 2, and output signal $\overline{Q}$ changes from its low level 71 to its high level 72. The delay shown between the application of pulse 53 and the change in output signal $\overline{Q}$ is due to the time required to overcome the minority carrier storage inherent in transistor 41. This time lag may be as much as 1 microsecond. The minority carrier storage delay occurs only when a transistor is conducting in a saturated condition and is then cut off. Therefore, the delay is apparent in both output signals Q and $\overline{Q}$ as seen at 65, 69, and 72 of Fig. 2. If this time is critical in a particular application, the delay may be prevented by use of circuits well-known to the art. Flip-flop output signal Q dropping to its zero level lowers the potential on the cathode of diode 27 so that it becomes conducting once more. This prevents capacitor 31 from recharging to the potential level of input signal 52 during the remainder of its duration.

Transistor 16 isolates the clock pulse and intelligence signal sources coupled to terminals 37 and 28, respectively, from each other and the intelligence signal source from the flip-flop. Therefore, little power is required from the intelligence signal source to effect switching of the flip-flop. Since diode 23 only conducts during the application of a positive signal to its anode, it performs two functions. First it isolates the flip-flop from transistor 16 and second it prevents any negative overshoot of the trigger pulse from being applied to the flip-flop.

Assume now that another intelligence signal A is applied at a later time to input terminals 28, as represented by 56 on Fig. 2. Since the output signal Q of the flip-flop is in its zero state, as shown at 55, diode 27 will remain conducting even though diode 29 becomes non-conducting. Therefore, capacitor 31 will not charge as before. Output signal Q, therefore, operates as a suppression signal. Since capacitor 31 cannot charge, transistor 16 will not be conditioned to conduit. Since transistor 16 is not conditioned to conduct, application of a succeeding clock pulse 57 to base 21 will have no effect upon transistor 16 and the flip-flop will remain in its present state.

Assume now that an input signal B is applied at later time to input terminals 28′, as shown at 61 in Fig. 2. Input circuit 13 will function essentially the same as input circuit 12 which was previously explained. Diode 29′ will be non-conducting upon application of input signal 61 and since $\overline{Q}$ is in its 1-level, as shown at 62, diode 27′ becomes non-conducting. This causes capacitor 31′ to charge and condition transistor 16′ to conduct. Upon application of the next succeeding clock pulse, represented at 63, transistor 16′ conducts, producing an output pulse 66 which is applied to flip-flop 11. Flip-flop 11 then changes from one of its stable states to the other. In this instance, $\overline{Q}$ changes from its 1 to its 0-level as shown at 64, and Q changes from its 0 to 1-level, as shown at 65. The delay, as explained above, is present in output signal Q.

If signals A and B are applied simultaneously to input terminals 28 and 28′, as represented at 74 and 75, respectively, during a still later time, there could be a possibility of ambiguous triggering of the flip-flop upon application of clock pulse 66. However, since output signals Q and $\overline{Q}$ are applied as suppression signals to input terminals 28 and 28', respectively, and Q is at its 1-level, only transistor 16 will conduct upon application of clock pulse 66. Therefore, a single output pulse, as represented at 67, will be applied to flip-flop 11, causing the flip-flop to change its state of operation, as shown at 68 and 69.

The transistors in the output circuits 14, 15 are used to amplify the flip-flop output signals. When that portion of flip-flop 11 to which base 44 of transistor 41 is connected is conducting, which may, for example, be collector of one of the transistors of the flip-flop, transistor 41 is non-conducting because its emitter 42 is negative with respect to base 44. Transistor 41 is therefore cut off and, hence, causes output signal Q to rise toward its high or 1-level, which is limited by the clamping network composed of diode 51 and battery 52. When transistor 16 conducts, applying a trigger signal to flip-flop 11, causing it to cut off, base 44 of transistor 41 becomes negative with respect to output signal Q. This causes transistor 41 to conduct, allowing current to flow through resistors 46 and 47. Current flowing through resistor 47 causes a voltage drop across it, thus lowering output signal Q toward a value limited by the clamping network including diode 48 and battery 53.

Since transistor 41 is a grounded-collector transistor amplifier employing current injection into its base as the input, a small amount of input current results in a large amount of output current, particularly if a junction type transistor is used. Therefore, it becomes evident that a large number of diode-resistor gates may be connected directly to output terminals 54 without loading flip-flop 11, the number being determined by the current amplification of transistor 41.

It will be understood that the circuit specifications for the circuit shown in Fig. 1 may vary according to the design for any particular application. The following circuit specifications are included by way of example only, suitable for operation with input signals having a frequency of from zero to 300 kilocycles per second:

| | |
|---|---|
| Resistors 24, 24' | 6,800 ohms. |
| Resistors 25, 25' | 2,700 ohms. |
| Resistors 32, 32' | 200,000 ohms. |
| Resistors 34, 34' | 1,000 ohms. |
| Resistors 45, 45' | 4,300 ohms. |
| Resistors 46, 46' | 2,000 ohms. |
| Resistors 47, 47' | 5,100 ohms. |
| Capacitors 22, 22' | 100 micro-microfarads |
| Capacitors 31, 31' | 220 micro-microfarads |
| Transistors 16, 16' | Point contact, General Electric type G11–A. |
| Transistors 41, 41' | Junction, Raytheon type CK721 |
| Diodes 23, 23', 27, 27', 36, 36', 48, 48', 51, 51' | Germanium Diode, Hughes Aircraft Company Type HD–2039 |
| Battery 26 | 25 volts |
| Battery 32 | 30 volts |
| Battery 35 | 10 volts |
| Battery 52 | 10 volts |
| Battery 53 | 12 volts |

Although P-N-P junction or N-type point-contact transistors are schematically represented in the circuit of Fig. 1, it is to be understood that N-P-N junction or P-type point-contact transistors may be employed by reversing the polarities of the applied input signals and the operating potentials.

There has been thus disclosed a system adapted to couple signals into and out of a flip-flop which isolates the intelligence and clock pulse signal sources from the flip-flop and from each other, thus preventing loading of the intelligence signal source and allowing a single flip-flop to drive a plurality of diode resistor gates simultaneously without affecting the operation of the flip-flop.

What is claimed is:

1. A system for coupling signals into and out of a flip-flop comprising: a flip-flop having a first and second input circuit and a first and second output circuit, each of said input circuits including a monostable device having a quasi-stable state, each of said monostable devices including an output circuit and a transistor having an emitter, a collector and a base, a pair of input terminals associated with each of said monostable devices, first gating means under the control of said flop-flop and responsive to the application of an intelligence signal to said input terminals and connected between said pair of input terminals and the base and emitter of said transistor for sensing the state of conduction of said flip-flop and for impressing said intelligence signal upon said monostable device when said flip-flop is in a predetermined state of conduction to condition said transistor to produce a trigger pulse, second gating means coupled between said base and emitter for impressing a control signal across said base and emitter to cause said transistor to trigger said monostable device into said quasi-stable state upon the coincidence of said intelligence signal, said control signal and said predetermined state of conduction of said flip-flop, and coupling means connected between the output circuit of said monostable device and said flip-flop for impressing the signal developed in the output circuit of said monostable device upon said flip-flop.

2. A system for coupling signals into and out of a flip-flop comprising: a flip-flop having a first and second input circuit and a first and second output circuit; each of said input circuits including a monostable transistor circuit, said transistor having an emitter, a collector, and a base, first gating means connected to said emitter for sensing the state of conduction of said flip-flop and for impressing an intelligence signal upon said emitter to condition said transistor to produce a trigger pulse when said flip-flop is in a predetermined state of conduction, second gating means connected to said base for impressing a control signal upon said base to cause said transistor to produce a trigger pulse upon the coincidence of said intelligence signal, said control signal, and said predetermined state of conduction of said flip-flop; coupling means connecting said collector to said flip-flop for impressing the trigger pulse upon said flip-flop; and each of said output circuits including a semiconductor amplifier for amplifying the output signal developed by said flip-flop.

3. A system for coupling signals into and out of a flip-flop comprising: a flip-flop having a first and second input circuit and a first and second output circuit; each of said input circuits including a monostable transistor circuit, said transistor being of the point contact type and having an emitter, a collector, and a base; first rectifying means connected between said emiter and one of said output circuits for changing the state of conduction of said rectifying means in accordance with the state of conduction of said flip-flop; second rectifying means connected to said emitter for impressing an intelligence signal upon said emitter when said flip-flop is in a predetermined state of conduction to condition said transistor to produce a trigger pulse; an impedance element connected between said base and said source of potential; third rectifying means connected to said base for applying a control signal thereto to cause said transistor to produce a trigger pulse upon coincidence of said intelligence signal, said control signal and said predetermined state of conduction of said flip-flop; coupling means connected to said collector for impressing the trigger pulse upon said flip-flop; and each of said output circuits including a junction transistor amplifier for amplifying the output signal derived from said flip-flop.

4. A system for coupling signals into and out of a flip-flop comprising: a flip-flop having a first and second input circuit and a first and second output circuit; each of said input circuits including a monostable point contact transistor circuit, said transistor having a first emitter, a first collector, and a first base, a source of potential for supplying operating potentials, a capacitor connected between said first emitter and a common terminal point, a first diode connected between one of said output circuits and said first emitter for changing the state of conduction of said diode in accordance with the state of conduction of said flip-flop; a second diode connected to said first emitter for impressing an intelligence signal upon said capacitor when said first diode is in a noncoducting state to condition said transistor to produce a trigger pulse, third rectifying means connected to said first base for applying a control signal thereto to cause said transistor to produce a trigger pulse upon coincidence of said intelligence signal, said control signal and said first diode being in a nonconducting state, and coupling means connected between said first collector and said flip-flop for impressing said trigger pulse upon said flip-flop; each of said output circuits including a junction transistor having a second emitter, a second collector, and a second base, said second base being connected to said flip-flop, clamping means connected to said second emitter for limiting the voltage level swing of the output signal derived from said flip-flop, and means for impressing the output signal obtained from the flip-flop to said first diode to sense the condition of said flip-flop, whereby said flip-flop will change from one of its stable states to the other upon coincidence of the control and inteligence signals if said flip-flop is in one predetermined state, but will not change stable states if it is in its other state.

References Cited in the file of this patent

UNITED STATES PATENTS

| | | |
|---|---|---|
| 2,644,887 | Wolfe | July 7, 1953 |
| 2,670,445 | Felker | Feb. 23, 1954 |
| 2,719,228 | Auerbach et al. | Sept. 27, 1955 |
| 2,724,780 | Harris | Nov. 22, 1955 |